(12) United States Patent
Yang et al.

(10) Patent No.: US 9,607,098 B2
(45) Date of Patent: Mar. 28, 2017

(54) DETERMINATION OF PRODUCT ATTRIBUTES AND VALUES USING A PRODUCT ENTITY GRAPH

(71) Applicant: Wal-Mart Stores, Inc., Bentonville, AR (US)

(72) Inventors: Fan Yang, Redwood City, CA (US); Narasimhan Rampalli, Los Altos, CA (US); Digvijay Lamba, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 339 days.

(21) Appl. No.: 14/293,997

(22) Filed: Jun. 2, 2014

(65) Prior Publication Data
US 2015/0347572 A1 Dec. 3, 2015

(51) Int. Cl.
*G06F 17/30* (2006.01)
*G06F 7/00* (2006.01)

(52) U.S. Cl.
CPC .. *G06F 17/30958* (2013.01); *G06F 17/30342* (2013.01); *G06F 17/30587* (2013.01); *G06F 17/30705* (2013.01)

(58) Field of Classification Search
CPC ......... G06F 17/30705; G06F 17/30321; G06F 17/30542; G06F 17/30342
See application file for complete search history.

(56) References Cited

U.S. PATENT DOCUMENTS

| | | | |
|---|---|---|---|
| 7,082,426 B2 | 7/2006 | Musgrove et al. | |
| 7,870,039 B1 | 1/2011 | Dom et al. | |
| 7,996,440 B2 | 8/2011 | Probst et al. | |
| 8,838,618 B1* | 9/2014 | Wu | G06F 17/30 707/750 |
| 9,135,329 B1* | 9/2015 | Gupta | G06F 17/3064 |
| 2011/0225161 A1 | 9/2011 | Zhong et al. | |
| 2013/0159209 A1* | 6/2013 | Zhao | G06Q 10/067 705/348 |

OTHER PUBLICATIONS

Duan et al, A Probabilistic Mixture Model for Mining and Analyzing Product Search Log, CIKM 2013, Oct. 27-Nov. 1, San Francisco, CA, USA, pp. 2179-2188.*

(Continued)

*Primary Examiner* — Marc Somers
(74) *Attorney, Agent, or Firm* — Bryan Cave LLP

(57) ABSTRACT

A method of determining structured product information for a product from a product description using a product entity graph. The product graph can include a plurality of nodes. Each of the plurality of nodes can include an entity value key, one or more entity names, and an entity name count for each of the one or more entity names. The method can include determining k-grams of the product description. The method also can include, for each k-gram of the product description, determining a matching node of the plurality of nodes of the product entity graph that corresponds to the k-gram and determining a derived entity name for the product from the one or more entity names of the matching node based at least in part on the entity name counts corresponding to the one or more entity names. Other embodiments of related systems and methods are also disclosed.

20 Claims, 9 Drawing Sheets

(56) References Cited

OTHER PUBLICATIONS

Gattani et al, Entity Extraction, Linking, Classification, and Tagging for Social Media: A Wikipedia-Based Approach, The 39th International Conference on Very Large Data Bases, Aug. 26-Aug. 30, 2013, Riva del Garda, Trento, Italy, pp. 1126-1137.*
Bootstrapped Named Entity Recognition for Product Attribute Extraction, Proceedings of the 2011 Conference on Empirical Methods in Natural Language Processing, pp. 1557-1567, Edinburgh, Scotland, UK, Jul. 27, 2011.
Text Mining for Product Attribute Extraction, Rayid Ghani, Katharina Probst, Yan Liu, Marko Kremma, Andrew Fano, SIGKDD Explorations, vol. 8, Issue 1, pp. 42-46, Jun. 1, 2006.
n-gram, http://en.wikipedia.org/wiki/N-gram, Wikipedia, pp. 1-6, accessed May 27, 2014.
Social media Analytics: The Kosmix Story, Bulletin of the IEEE Computer Society Technical Committee on Data Engineering, pp. 1-8, 2013.
Inverted index, http://en.wikipedia.org/wiki/inverted_index, Wikipedia, pp. 1-2, accessed May 7, 2014.
Knowledge Graph, http://en.wikipedia.org/wiki/knowledge_graph, Wikipedia, pp. 1-2, accessed May 19, 2014.
Knowledge Base, http://en/wikipedia.org/wiki/knowledge_base, Wikipedia, pp. 1-2, accessed May 19, 2014.

\* cited by examiner

DETERMINATION OF PRODUCT ATTRIBUTES AND VALUES USING A PRODUCT ENTITY GRAPH

TECHNICAL FIELD

This disclosure relates generally to commerce in a computer network system, and relates more particularly to determination of product attributes and values using a product entity knowledge graph.

BACKGROUND

Many eCommerce web sites categorize and/or organize products for purposes of searching and/or browsing using attributes (such as brand, price, weight, color, etc.) and values for those attributes. For example, a television (TV) product can have several attributes-value pairs, such as brand of Samsung, input video format of 1080p, screen size of 30"-39", etc. Entering all of the attribute-value pairs for a product can be a cumbersome task that vendors often prefer to avoid. Furthermore, many eCommerce web sites allow third-party sellers to sell products. These third-party sellers often do not provide all the attribute-value pairs for the products they sell, and sometimes provide only a basic description, such as a title. Without attribute-value pairs, it can be difficult to accurately list the products on the website for consumers to find through browsing and/or searching.

BRIEF DESCRIPTION OF THE DRAWINGS

To facilitate further description of the embodiments, the following drawings are provided in which.

Figure 1:
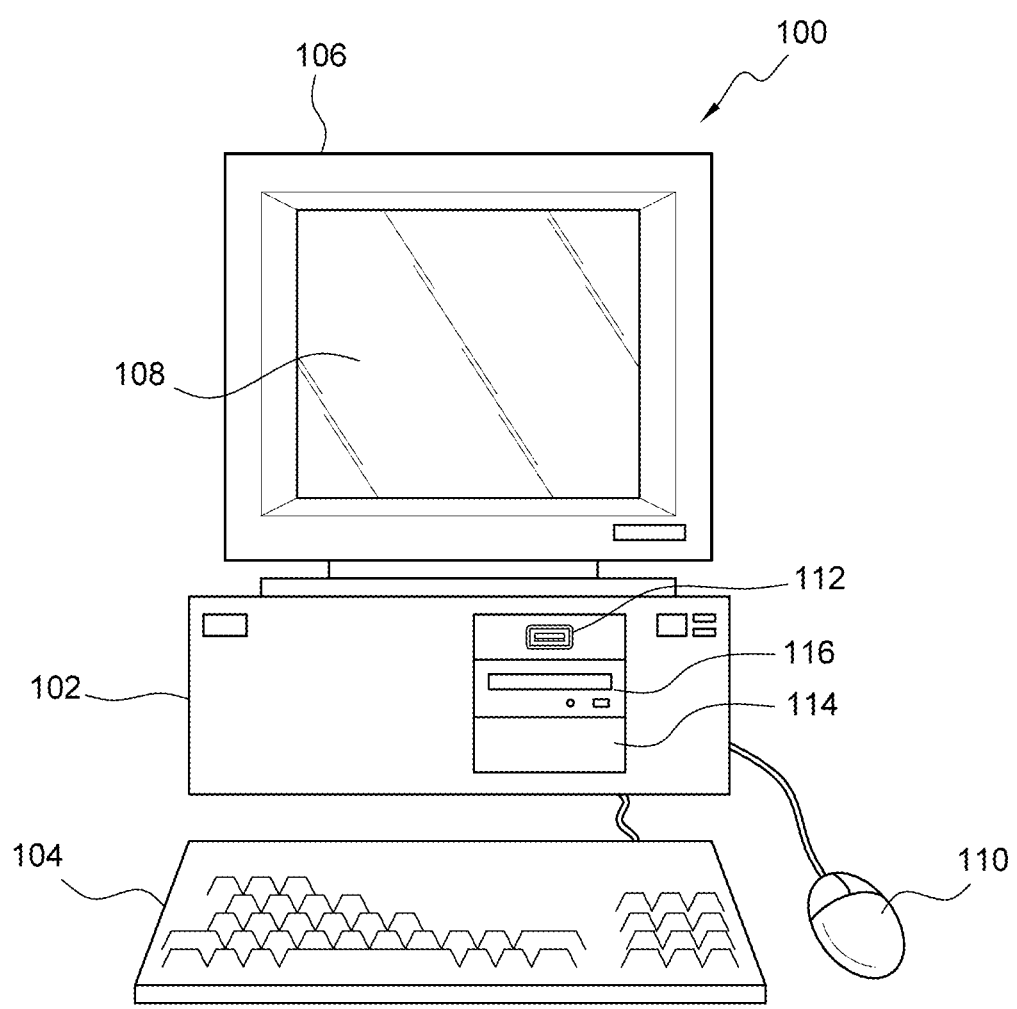
FIG. 1 illustrates a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method of determining structured product information for a product from a product description using a product entity graph. The product graph can include a plurality of nodes. Each of the plurality of nodes can include an entity value key, one or more entity names, and an entity name count for each of the one or more entity names. The method can be implemented via execution of computer instructions configured to run at one or more processing modules and configured to be stored at one or more non-transitory memory storage modules. The method can include determining k-grams of the product description. The method also can include, for each k-gram of the product description, determining a matching node of the plurality of nodes of the product entity graph that corresponds to the k-gram and determining a derived entity name for the product from the one or more entity names of the matching node based at least in part on the entity name counts corresponding to the one or more entity names.

A number of embodiment include a method of determining structured product information for a product from a product description. The method can be implemented via execution of computer instructions configured to run at one or more processing modules and configured to be stored at one or more non-transitory memory storage modules. The method can include creating a product entity graph using a group of known products having known attribute-value pairs. The product entity graph can include a plurality of nodes. Each of the plurality of nodes can include an entity value key, one or more entity names, and an entity name count for each of the one or more entity names. The method also can include determining k-grams of the product description. The method further can include, for each k-gram of the product description, determining a matching node of the plurality of nodes of the product entity graph that corresponds to the k-gram, and determining a derived entity name for the product from the one or more entity names of the matching node based at least in part on the entity name counts corresponding to the one or more entity names.

Several embodiments include a system for determining structured product information for a product from a product description. The system can include one or more processing modules and one or more non-transitory memory storage modules storing computing instructions configured to run on the one or more processing modules and perform various acts. The acts can include creating a product entity graph using a group of known products having known attribute-value pairs. The product entity graph can include a plurality of nodes. Each of the plurality of nodes can include an entity value key, one or more entity names, and an entity name count for each of the one or more entity names. The acts can also include determining k-grams of the product description. The acts can further include, for each k-gram of the product description, determining a matching node of the plurality of nodes of the product entity graph that corresponds to the k-gram, and determining a derived entity name from the entity names of the matching node based at least in part on the entity name counts corresponding to the entity names.

Embodiments include building a scalable and/or efficient product entity knowledge graph. The knowledge graph can serve as a center repository for product related entities, and can significantly improve product entity extraction.

Figure 2:
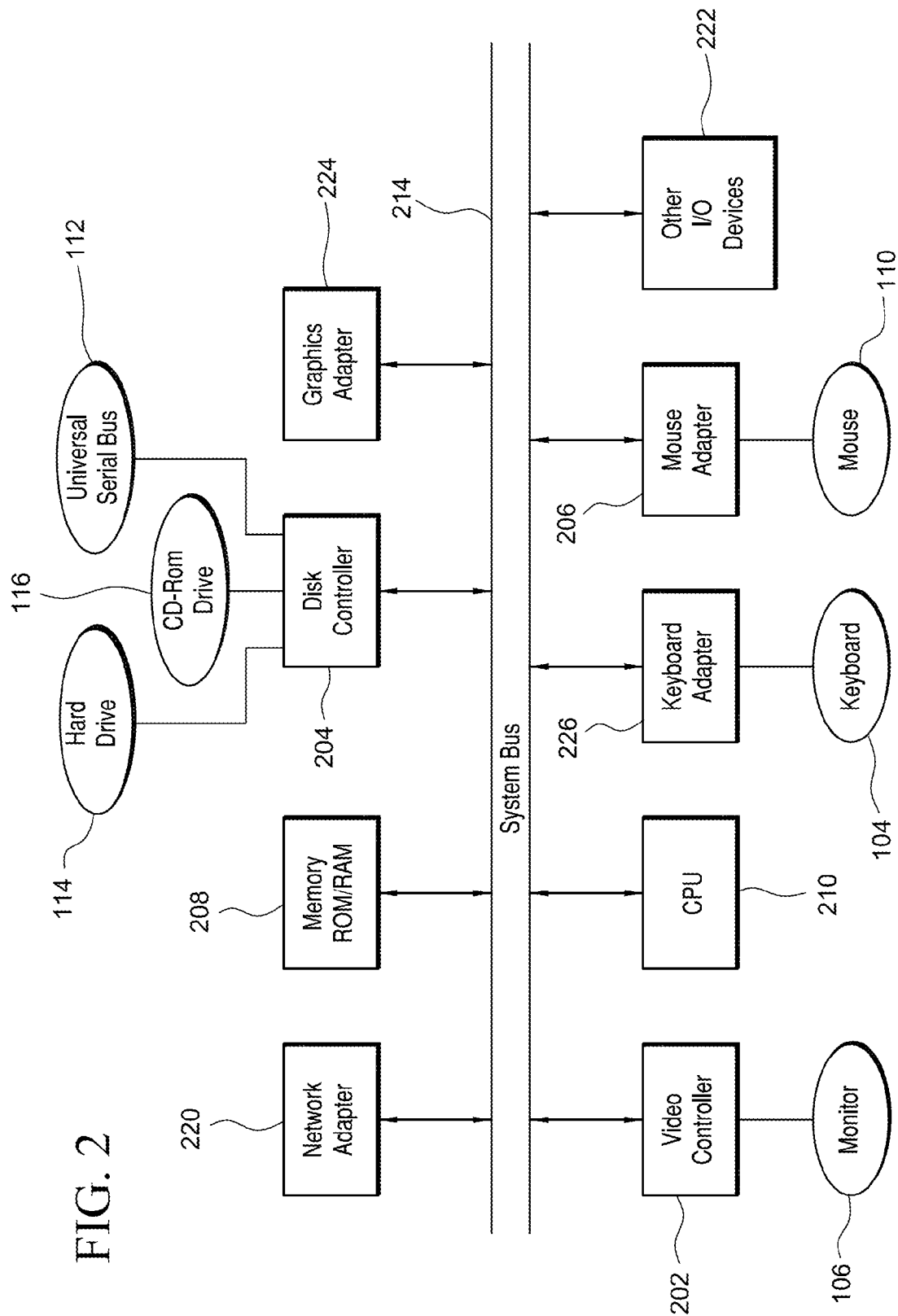
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG.

1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
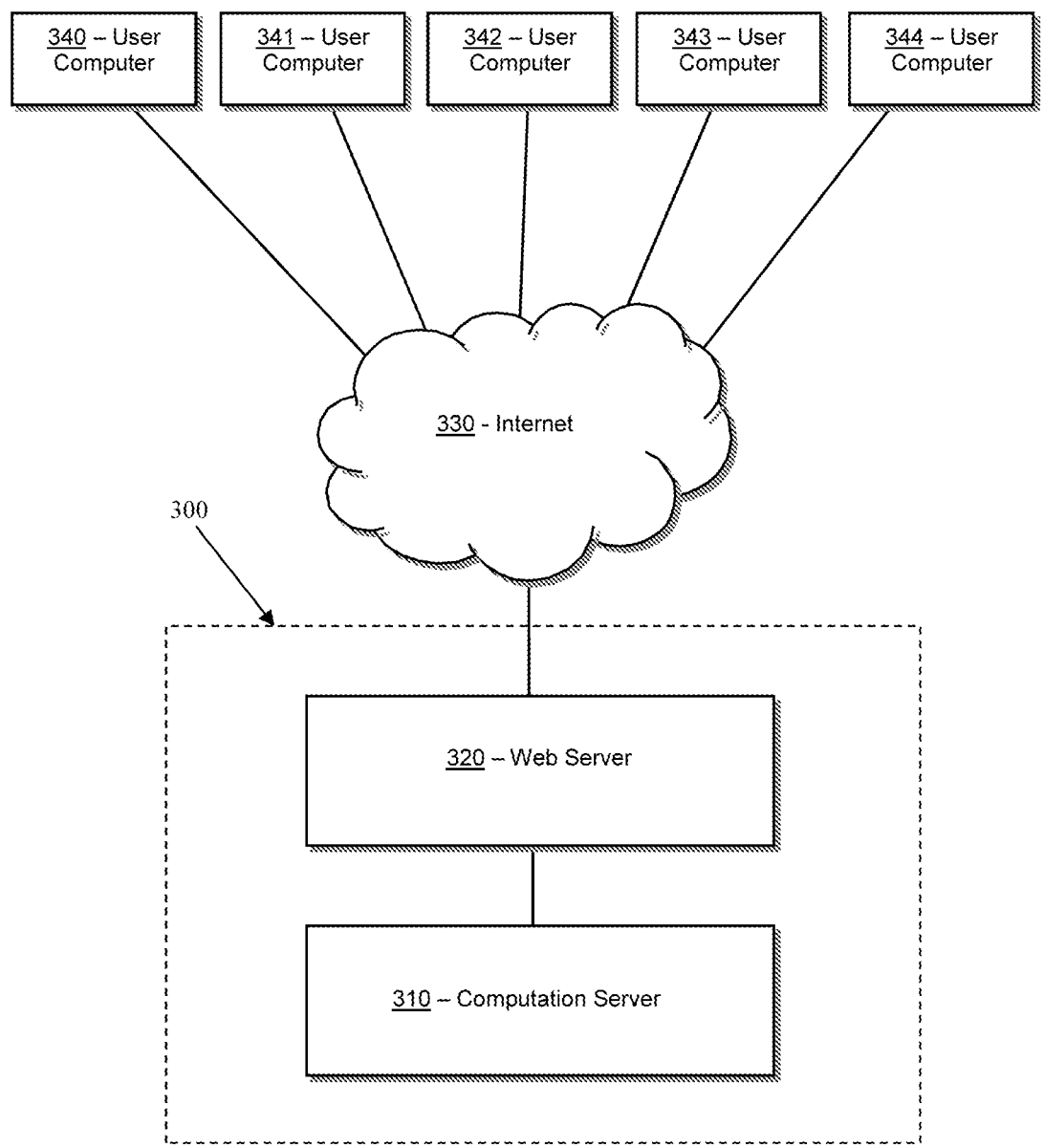
FIG. 3 illustrates a block diagram of an example of a system for determination of product attributes and values using a product entity graph, according to an embodiment.

Turning ahead in the drawings, FIG. 3 illustrates a block diagram of a system 300 that can be employed for determination of product attributes and values using a product entity graph, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300. In some embodiments, system 300 can include an computation server 310 and/or a web server 320. Web server 320 and/or computation server 310 can each a computer system, such as computer system 100 (FIG. 1), as described above, and can each be a single computer, a single server, or a cluster or collection of computers or servers, or a cloud of computers or servers. In a different embodiment, computation server 310 and web server 310 can be integrated into a single computer, a single server, the same cluster or collection of computers or servers, or the same cloud of computers or servers. Additional details regarding computation server 310 and web server 320 are described herein.

In some embodiments, web server 320 can be in data communication through Internet 330 with user computers (e.g., 340, 341, 342, 342, 344). In certain embodiments, user computers 340-344 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities. In various embodiments, various products sold through the website can include a title, an image, a free form description, and/or a structure map of attributes and values. For example, a certain TV product can have, at least in part, the following attributes and values:

| ATTRIBUTE | VALUE |
| --- | --- |
| Brand | Sceptre |
| Color | Black |
| Screen Size | 30"-39" |
| Screen Size Raw Unit | " |
| Refresh Rate | 60 Hz |
| Category | TV |

Each set of attributes and values is an attribute-value pair. For example, "Brand" is an attribute, and "Sceptre" is the value associated with the attribute, such that "Brand" and "Sceptre" form an attribute-value pair. The attribute-value pairs associated with the products can enable the website to provide improved searching and/or browsing for the products.

In many embodiments, users, such as third-party sellers, can use a user computer (e.g., 340-344) to input information to web server 320 regarding one or more products to be sold through the website. In many cases, the information input by the users does not include any attribute-value pairs, or does not include all of the relevant attribute-value pairs. For example, a user may have entered only a basic product description, such as a short title describing the product, such as "White Apple iPad 32 GB." In many embodiments, system 300 can be used to extract semantic words or phrases in the description and determine attributes and values for the product, and in a number of embodiments, can infer additional attributes and/or values for the product.

In many embodiments, attribute-value pairs are known for many products, such as existing products already sold on the website, or products sold, described, and/or reviewed on other websites. For example, Walmart.com can have approximately 1.5 million existing products with correct attribute-value pairs. On average, each product can have approximately 50 attribute-value pairs. Other websites, such as CNET, Wikipedia, Bowker, Vudu, etc., also can include attribute-value pairs for products. The attribute-value pairs for a product are sometimes referred to herein as product entities. The attributes of the product entities sometimes are referred to herein as product entity names, and the values of the product entities sometimes are referred to herein as product entity values. In a number of embodiments, system 300 can use the product entities from one or more of these sources can be used to create a product entity graph, which can be similar to a knowledge graph, such those built for general purpose information structuring by Freebase (now Google Knowledge Graph), Kosmix (now part of Walmart-Labs), and Wikipedia. In several embodiments, system 300 can employ optimizations for (a) the information to be stored in the product entity graph, (b) how the information is stored in the product entity graph, and/or (c) how to leverage the product entity graph to extract product entities for new products.

In many embodiments, system 300 can store the product entity graph in a scalable and/or efficient fashion. In a number of embodiments, the product entity graph can be a large-scale undirected graph of the product entities, as described below. In certain embodiments, system 300 can filter out one or more product entities. For example, some product entity values can be several words long, such as an ingredient list. In many embodiments, product entity values having a word length that is more than a word limit threshold can be filtered out from being added to the product entity graph. In a number of embodiments, the word limit threshold can be six words. In other embodiments, the word limit threshold can be greater than or less than six words. In general, most relevant attribute values are no more than six words long. As other examples, stop words, yes/no values, dates and/or certain types of numbers (e.g., all numbers except sizes, global trade identification numbers (GTINs), or uniform product codes (UPCs)) in product entity values can be filtered out, as these values can be common for many types of attributes and are often not very useful for deriving and/or inferring a corresponding product entity name.

Figure 4:
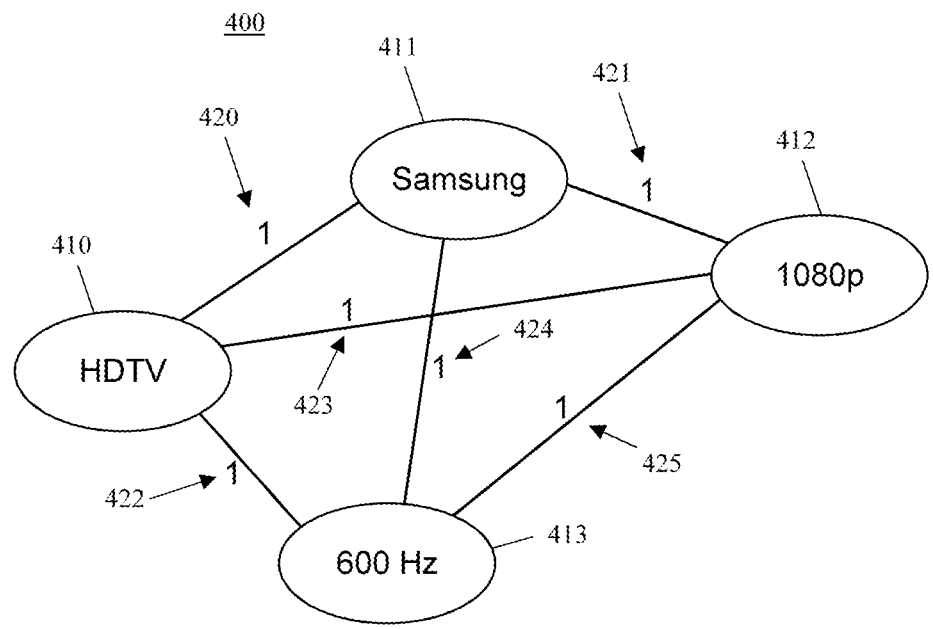
FIG. 4 illustrates an exemplary product entity graph, according to another embodiment.
Figure 5:
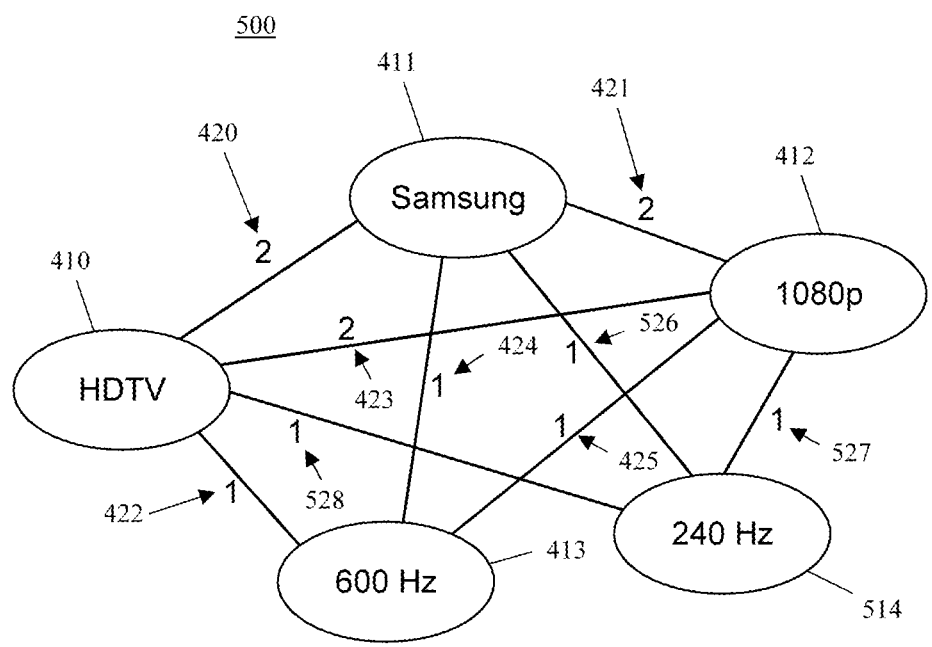
FIG. 5 illustrates an exemplary product entity graph, which can be an updated version of the product entity graph of FIG. 4.

Turning ahead in the drawings, FIG. 4 illustrates an exemplary product entity graph 400, according to an embodiment. FIG. 5 illustrates an exemplary product entity graph 500, which can be an updated version of exemplary product entity graph 400. Product entity graphs 400 and 500 are merely exemplary, and embodiments for determination of product attributes and values using a product entity graph can be employed in many different embodiments or examples not specifically depicted or described herein. In some embodiments, product entity graphs 400 and 500 illustrate, using very simplified data, the operation of a product entity graph. For example, a first product can include various product entities, such as brand of Samsung, input video format of 1080p, TV definition of HDTV, and refresh rate of 600 Hz. Each of these entities can be represented by nodes in product entity graph 400. For example, the HDTV product entity can be represented in product entity graph 400 by a node 410, the Samsung product entity can be represented in product entity graph 400 be a node 411, the 1080p product entity can be represented in product entity graph 400 by a node 412, and the 600 Hz product entity can be represented in product entity graph 400 by a node 413.

In many embodiments, various nodes (e.g., 410, 411, 412, 413) of product entity graph 400 can be connected by edges, such as edges 420, 421, 422, 423, 424, and 425. Each of the edges (e.g., 420-425) can connect two nodes (e.g., 410-413), and can represent that each of product entities represented by the two nodes co-occur in the same product. Because each of nodes 410-413 in FIG. 4 represent product entities that co-occur in the same product, namely the first product having the brand of Samsung, input video format of 1080p, tv definition of HDTV, and refresh rate of 600 Hz, each of the nodes is connected to each of the other nodes by an edge (e.g., 420-425).

In a number of embodiments, each edge connecting two nodes can have a weight, which can indicate the total number of products in which the product entities represented by the two nodes co-occur. The weight of an edge connecting nodes representing product entities i and j can be equal to the number of products in which product entities i and j co-occur. In other words, product entities occurring in the same product can be connected in product entity graph 400.

As shown in FIG. 4, the weight of each edge (e.g., 420-425) is 1, as product entity graph 400 includes only the first product, and all of the product entities occur in the first product.

To further illustrate the operation of a product entity graph, product entity graph 500 in FIG. 5 illustrates an update to product entity graph 400 after adding a second product that includes product entities such as brand of Samsung, input video format of 1080p, TV definition of HDTV, and refresh rate of 240 Hz. The HDTV product entity, the Samsung product entity, and the 1080p product entity can be represented in product entity graph 400 by existing nodes, namely node 410, node 411, and node 412, respectively. The 240 Hz product entity can be represented in product entity graph 400 by a node 514, which is a new node. Node 514 can be connected to nodes 410, 411, and 412 by edges 528, 526, and 527, respectively. Edges 526-528 can have a weight of 1, as the 240 Hz product entity occurs in the second product, but not the first product. The weight of edge 420 can be updated from 1 to 2 to indicate that the HDTV and Samsung product entities co-occur in two products, namely the first and second products. Similarly, the weights of edges 421 and 423 can be updated from 1 to 2, based on the co-occurrence of Samsung and 1080p, and the co-occurrence of HDTV and 1080p, respectively, in both the first and second products. The weight of an edge (e.g., 420-425, 526-528) can indicate the correlation between the two product entities represented by the two nodes connected by the edge.

Figure 6:
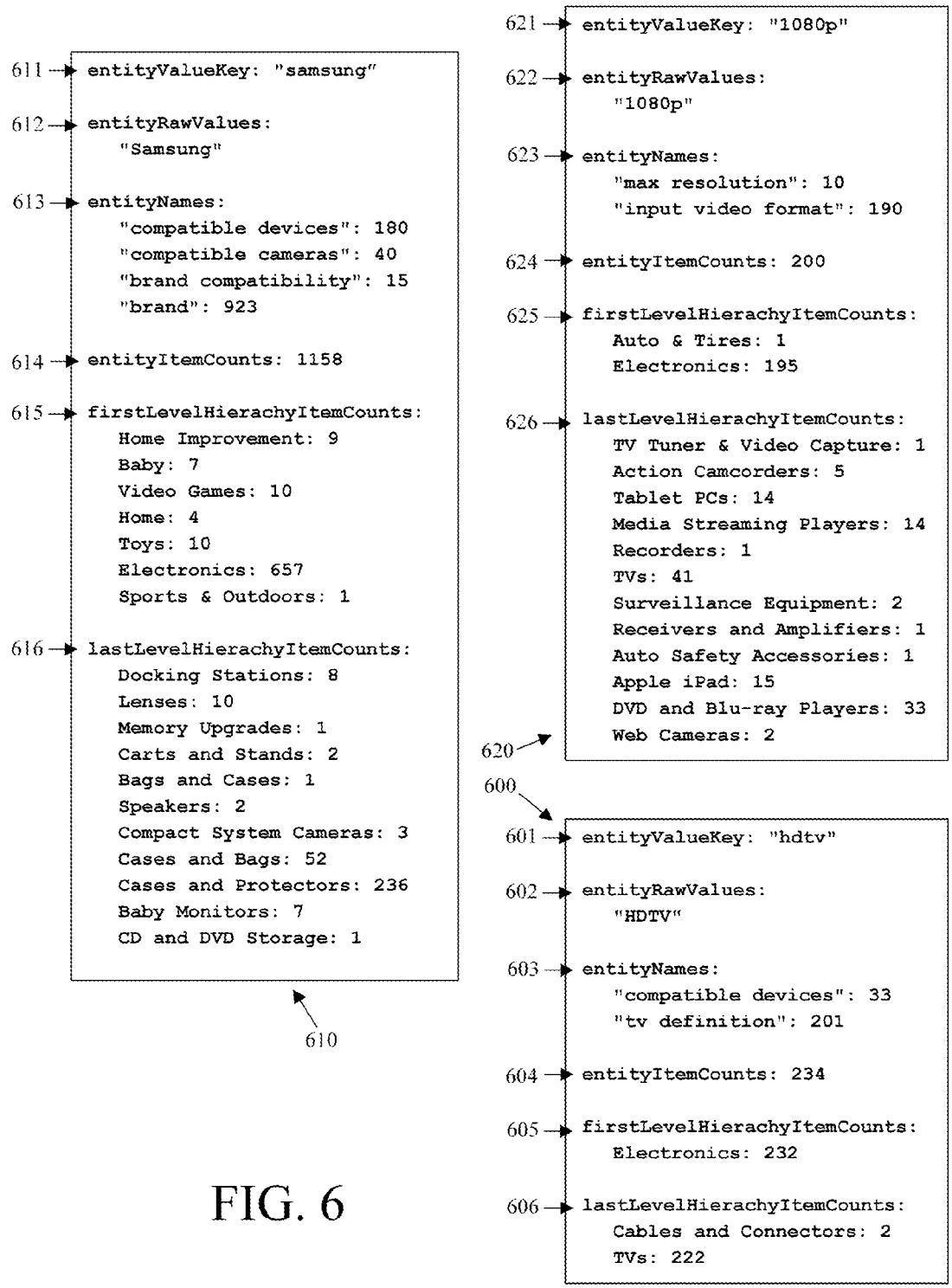
FIG. 6 illustrates exemplary node structures, according to the embodiments of FIGS. 4-5.

FIG. 6 illustrates exemplary node structures 600, 610, and 620 corresponding to various nodes of product entity graph 400 and product entity graph 500. Node structures 600, 610, and 620 are merely exemplary, and embodiments for determination of product attributes and values using a product entity graph can be employed in many different embodiments or examples not specifically depicted or described herein. Node structures 600, 610, and 620 in FIG. 6 illustrate exemplary data structures for nodes 410, 411, and 412 (FIG. 4), respectively. In a number of embodiments, node structure 600 can include an entity value key 601, an entity raw values list 602, an entity names list 603, and entity item count 604, a first level hierarchy list 605, and/or a last level hierarchy list 606; node structure 610 can include an entity value key 611, an entity raw values list 612, an entity names list 613, and entity item count 614, a first level hierarchy list 615, and/or a last level hierarchy list 616; and/or node structure 620 can include an entity value key 621, an entity raw values list 622, an entity names list 623, and entity item count 624, a first level hierarchy list 625, and/or a last level hierarchy list 626. In several embodiments, the first level hierarchy lists (e.g., 605, 615, 625) and the last level hierarchy lists (e.g., 606, 616, 626) shown in FIG. 6 can be partial lists.

In many embodiments, the product entity value of a product entity to be stored in the product entity graph (e.g., 400 (FIG. 4), 500 (FIG. 5)) can be normalized to an entity key. In a number of embodiments, the product entity value can be normalized by performing one or more conversions of the product entity value to create the entity key. For example, system 300 (FIG. 3) can convert numbers to patterns. To illustrate, a product entity value having a number of 50.6 can be converted in the entity key to a regular expression pattern of $-?\backslash d*(\backslash .\backslash d+)?$, which can represent any number of the same format. As another example, system 300 (FIG. 3) can convert units to a standard unit value, such that inch, in, ", and/or ins, each of which represent units of inches, are converted to" for consistency. As yet another example, system 300 can use word stemming to convert product entity values to their root form. As yet a further example, variations of a word can be converted to a standard word. For example, colors can be limited to 15 standard colors, such that off-white colors can be converted to white, bronze can be converted to brown, etc.

In many embodiments, there can be more than one product entity value for a single entity key because two or more product entity values can be converted to the same entity key. In many embodiments, the entity key can be stored in the node structure (e.g., 600, 610, 620) as the entity value key (e.g., 601, 611, 612). In many embodiments, the product entity value can be stored in the node structure (e.g., 600, 610, 620) in the entity raw values list (e.g., 602, 612, 622). In many embodiments, each node structure (e.g., 600, 610, 620) can include only one entity key, but can include one or more product entity values in the entity raw values list (e.g., 602, 612, 622).

In many embodiments, the entity key stored in the entity value key (e.g., 601, 611, 612) of the node structure (e.g., 600, 610, 620) can be used to index the node structure (e.g., 600, 610, 620) and/or its corresponding node (e.g., 410, 411, 412 (FIGS. 4-5)) in the product entity graph (e.g., 400 (FIG. 4), 500 (FIG. 5)). In many embodiments, system 300 can build the product entity graph (e.g., 400 (FIG. 4), 500 (FIG. 5)) as an inverted index in which each node (e.g., 600, 610, 620) is keyed off of the entity value key. In several embodiments, the entity item count (e.g., 604, 614, 624) in each node structure (e.g., 600, 610, 620) can be the number of products having a product entity key that converts to the entity key stored in the entity value key (e.g., 601, 611, 612) of the node structure (e.g., 600, 610, 620).

In a number of embodiments, the entity names list (e.g., 603, 613, 623) in each node structure (e.g., 600, 610, 620) can include a list of the product entity names associated with the entity key. For example, a TV product can have a product entity of "brand=Samsung," and a Webcam product can have a product entity of "compatible cameras=Samsung." In both cases, the product entity values of Samsung can be converted to an entity key of "samsung," which is stored in entity value key 611 of node structure 610, and entity names list 613 can include the product entity names of "brand," and "compatible cameras." In many embodiments, each product entity name in the entity names list (e.g., 603, 613, 623) of the node structure (e.g., 600, 610, 620) can include an entity name count, which can be the number of products that (1) have the entity name and (2) have a product entity key that converts to the entity key stored in the entity value key (e.g., 601, 611, 612) of the node structure (e.g., 600, 610, 620). The entity name counts can indicate the frequencies with which the entity key is used for each product entity name. As shown in entity names list 613 of node structure 610, there are four product entity names that are associated with the entity key of "samsung" stored in entity value key 611, and each has a corresponding entity name count.

In several embodiments, products used to create the product entity graph (e.g., 400 (FIG. 4), 500 (FIG. 5)) can be classified in a categorization taxonomy with a multi-layered hierarchy. For example, a first hierarchy level of the categorization taxonomy can represent general departments, such as clothing, electronics, grocery, home improvement, jewelry, toys, etc. Each first hierarchy level can include many products. Each hierarchy level of the categorization taxonomy after the first level can be progressively more specific and include fewer products. Each product can be classified in the classification taxonomy and include a first hierarchy level, one or more intermediate hierarchy levels, and a last hierarchy level.

In many embodiments, the first level hierarchy list (e.g., 605, 615, 625) in each node structure (e.g., 600, 610, 620) can include a list of each first level hierarchy for products having a product entity key that converts to the entity key stored in the entity value key (e.g., 601, 611, 612) of the node structure (e.g., 600, 610, 620). In various embodiments, each first level hierarchy in the first level hierarchy list (e.g., 605, 615, 625) of a node structure (e.g., 600, 610, 620) can include an first level hierarchy count, which can be the number of products that (1) have the first level hierarchy and (2) have a product entity key that converts to the entity key stored in the entity value key (e.g., 601, 611, 612) of the node structure (e.g., 600, 610, 620). The first level hierarchy counts can indicate the frequencies with which the entity key is associated with each first level hierarchy. For example, the first level hierarchy of Electronics in first level hierarchy list 615 of node structure 610 has a corresponding first level hierarchy count of 657, which is relatively high, and which can indicate that the entity key of "samsung" stored in entity value key 611 is highly associated with the first level hierarchy of Electronics.

In a number of embodiments, the last level hierarchy list (e.g., 606, 616, 626) in each node structure (e.g., 600, 610, 620) can include a list of each last level hierarchy for products having a product entity key that converts to the entity key stored in the entity value key (e.g., 601, 611, 612) of the node structure (e.g., 600, 610, 620). In various embodiments, each last level hierarchy in the last level hierarchy list (e.g., 606, 616, 626) of a node structure (e.g., 600, 610, 620) can include an last level hierarchy count, which can be the number of products that (1) have the last level hierarchy and (2) have a product entity key that converts to the entity key stored in the entity value key (e.g., 601, 611, 612) of the node structure (e.g., 600, 610, 620). The last level hierarchy counts can indicate the frequencies with which the entity key is associated with each last level hierarchy. For example, the last level hierarchy of Cases and Protectors in last level hierarchy list 616 of node structure 610 has a corresponding last level hierarchy count of 236, which is relatively high, and which can indicate that the entity key of "samsung" stored in entity value key 611 is highly associated with the last level hierarchy of Cases and Protectors.

In several embodiments, the inverted-index structure of the data stored in the node structures (e.g., 600, 610, 620) can allow for scalability. The data can be stored in a distributed key value pair storage, such the entity value key (e.g., 601, 611, 621) can be retrieved efficiently, such as by using hashing. For example, Apache Cassandra or Apache HBase can be used for the distributed key value pair storage, which can provide scalability and/or fast access for node structures (e.g., 600, 610, 620) corresponding to nodes (e.g., 410, 411, 412 (FIG. 4)) in the product entity graph (e.g., 400 (FIG. 4), 500 (FIG. 5)).

In many embodiments, system 300 (FIG. 3) can import product entities from products with known attribute-value pairs, such as product sold on Walmart.com, to create the product entity graph (e.g., 400 (FIG. 4), 500 (FIG. 5)). In a number of embodiments, system 300 (FIG. 3) can import product entities from products having known attribute-value pairs that are sold, described, and/or reviewed on from other (e.g., third-party) sources, such as CNET, Bowker, Vudu, Wikipedia, etc., which can advantageously increase the product entity coverage of the product entity graph (e.g., 400 (FIG. 4), 500 (FIG. 5)). In many embodiments, the product entity graph (e.g., 400 (FIG. 4), 500 (FIG. 5)) can be open, flexible, and/or scalable, which can allow system 300 (FIG.

3) to readily and/or efficiently import data from other data sources. As described below, in various embodiments, system 300 (FIG. 3) can use the product entity graph (e.g., 400 (FIG. 4), 500 (FIG. 5)) to determine product entities (i.e., attribute-value pairs) for new products without attribute-value pair information.

Figure 7:
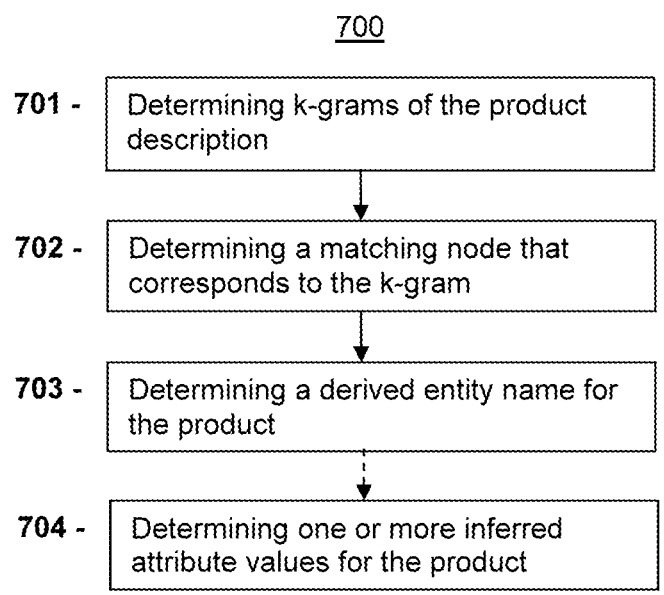
FIG. 7 illustrates a flow chart for an exemplary procedure of determining structured product information for a product from a product description, according to another embodiment.

Turning ahead in the drawings, FIG. 7 illustrates a flow chart for a method 700 of determining structured product information for a product from a product description using a product entity graph, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In some embodiments, method 700 can be implemented by computation server 310 (FIG. 3) and/or web server 320 (FIG. 3).

In some embodiments, the product entity graph can be identical or similar to product entity graph 400 (FIG. 4) and/or product entity graph 500 (FIG. 5). In many embodiments, the product entity graph can include a plurality of nodes, and/or each of the plurality of nodes can include an entity value key, one or more entity names, and/or an entity name count for each of the one or more entity names. In several embodiments, each of the plurality of nodes of the product entity graph can be identical or similar to nodes 410-413 (FIG. 4) and/or 514 (FIG. 5). Each of the plurality of nodes can have a corresponding node structure, which can be identical or similar to node structures 600, 610, and/or 620 (FIG. 6). The entity value key can be identical or similar to entity value key 601, 611, and/or 612 (FIG. 6). The entity name and/or the entity name counts can be listed in entity names list 603, 613, and/or 623 (FIG. 6).

Referring to FIG. 7, in some embodiments method 700 can include a block 701 of determining k-grams of the product description. For example, a user can input a product description of "Samsung 40" LED 1080p 60 Hz HDTV," but not enter any structured attribute-value pair information. In many embodiments, system 300 (FIG. 3) can determine linguistic units (k-grams) of the product description using conventional language analysis methods (also known as n-gram analysis). For example, system 300 can determine that "Samsung" is a one-word linguistic unit. Other linguistic units can be two or more words, such as "Banana Republic." In many embodiments, system 300 can determine k-grams for values of k less than or equal to six, which can determine linguistic units having a word length of up to six words. In several embodiments, each of the k-grams has a length of no more than six words. In a number of embodiments, the entity keys stored in the entity value keys (e.g., 601, 611, 621 (FIG. 6)) of the node structures (e.g., 600, 610, 620 (FIG. 6)) are limited to six words in length, based on the product entity values being filtered out when greater than six words in length. In several embodiments, block 701 can include filtering out k-grams that are stop words, yes/no values, dates, and/or certain types of numbers (e.g., all numbers except sizes, global trade identification numbers (GTINs), or uniform product codes (UPCs)). In many embodiments, the k-gram can be a product entity value, and system 300 can derive the associated product entity name.

In a number of embodiments, method 700 also can include a block 702 of, for each k-gram of the product description, determining a matching node of the plurality of nodes of the product entity graph that corresponds to the k-gram. In various embodiments, the matching node can be one of the nodes (e.g., 410-413 (FIG. 4), 514 (FIG. 5)) having a node structure (e.g., 600, 610, 620 (FIG. 6)) with an entity key stored in entity value key (e.g., 601, 611, 621 (FIG. 6)) that matches the k-gram. In several embodiments, block 702 can include converting the k-gram to a normalized key, which can include: (a) for numerical values, converting the k-gram to a regular expression pattern, (b) for units, converting the k-gram to a standard unit value, or (c) stemming the k-gram. As an example, system 300 can convert the k-gram of "Samsung" from the product description to "samsung," which matches the entity key in entity value key 611 (FIG. 6) of node structure 610 (FIG. 6).

In many embodiments, method 700 further can include a block 703 of, for each k-gram of the product description, determining a derived entity name for the product from the entity names of the matching node. In many embodiments, the derived entity name can be determined at least in part based on the entity name counts corresponding to the entity names. In some embodiments, system 300 (FIG. 3) can rank the product entity names in the entity names list (e.g., 603, 613, 623 (FIG. 6)) based on the entity name counts in the entity names list (e.g., 603, 613, 623 (FIG. 6)). For example, system 300 (FIG. 3) can select "brand" as a derived entity name corresponding to the product entity value "Samsung" for the product, based off the product entity name of "brand" having the highest count in entity names list 613 (FIG. 6). In other embodiments, system 300 (FIG. 3) can calculate a probability for each of the product entity names, and can determine the derived name based on the probabilities. The derived entity name can be used as the product entity name for the associated product entity value. By traversing each k-gram, system 300 (FIG. 3) can similarly determine attribute-value pairs (i.e., product entity names and values) for the product based on the product description of "Samsung 40" LED 1080p 60 Hz HDTV." In a number of embodiments, the product can be categorized in a website, such as a website hosted by web server 320 (FIG. 3), based on the product entity names and values, which can be based on one or more of the derived entity names.

In certain embodiments, method 700 can optionally include a block 704 of determining one or more inferred attribute values for the product from one or more related nodes of the plurality of nodes in the product entity graph. In many embodiments, system 300 (FIG. 3) can determine the inferred attributed values based at least in part on the matching nodes of the k-grams and weights of edges in the product entity graph between the one or more related nodes and the matching nodes. In several embodiments, system 300 (FIG. 3) can iterate through each neighboring node (e.g., nodes that are connected by an edge) to each matching node determined in block 702, and evaluate the relative weighs of the edges connecting the neighboring nodes to the matching nodes. In many embodiments, the inferred attribute values are not found in the product description provided by the user. For example, a user can enter a product with a product description of "Samsung 1080p." As shown in FIG. 5, because edge 421 has a weight showing a strong correlation between node 411 for Samsung and node 412 for 1080p, system 300 (FIG. 3) can examine other nodes that are connected to both node 411 and node 412, and determine, based on the weight of the edges connecting node 411 or node 412 to the other nodes, whether there is a strong correlation with those other nodes. For example, node 410 of HDTV is connected to node 411 of Samsung by edge 420, which has a weight showing a strong correlation between HDTV and Samsung, and node 410 of HDTV is also connected to node 412 of 1080p by edge 423, which has a weight showing a strong correlation between HDTV and 1080p. Based on these strong correlations, system 300 can infer that HDTV is also a product entity value for the product, even though HDTV is not found in the product description.

Figure 8:
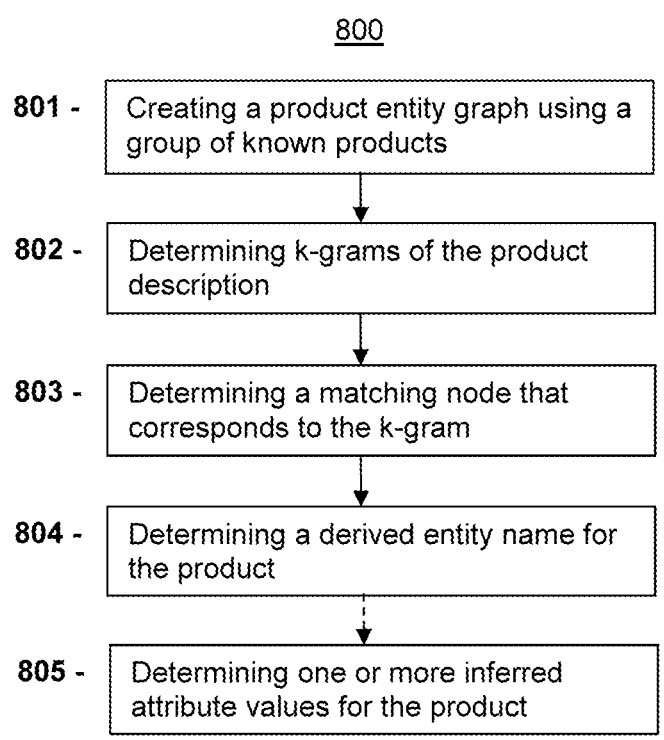
FIG. 8 illustrates a flow chart for an exemplary procedure of determining structured product information for a product from a product description, according to another embodiment.

Turning ahead in the drawings, FIG. 8 illustrates a flow chart for a method 800 of determining structured product information for a product from a product description, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In some embodiments, method 800 can be implemented by computation server 310 (FIG. 3) and/or web server 320 (FIG. 3).

Figure 9:
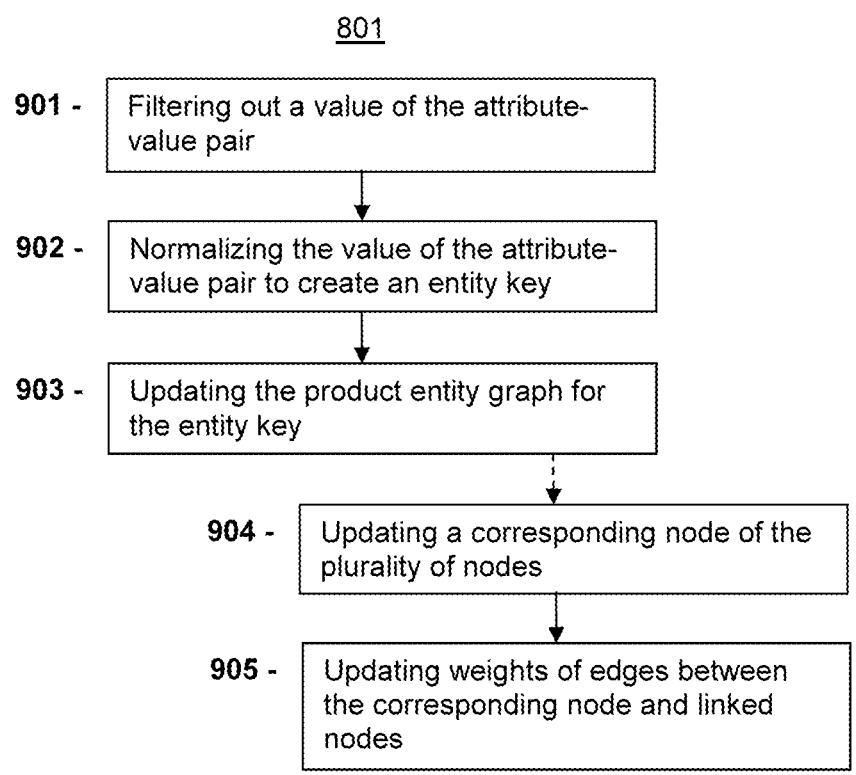
FIG. 9 illustrates a flow chart for an exemplary procedure of creating a product entity graph using a group of known products, according to the embodiment of FIG. 8.

Referring to FIG. 8, in some embodiments method 800 can include a block 801 of creating a product entity graph using a group of known products having known attribute-value pairs. In some embodiments, the product entity graph can be identical or similar to product entity graph 400 (FIG. 4) and/or product entity graph 500 (FIG. 5). In many embodiments, the product entity graph can include a plurality of nodes, and each of the plurality of nodes can include an entity value key, one or more entity names, and/or an entity name count for each of the one or more entity names. In several embodiments, each of the plurality of nodes of the product entity graph can be identical or similar to nodes 410-413 (FIG. 4) and/or 514 (FIG. 5). Each of the plurality of nodes can have a corresponding node structure, which can be identical or similar to node structures 600, 610, and/or 620 (FIG. 6). The entity value key can be identical or similar to entity value key 601, 611, and/or 612 (FIG. 6). The entity name and/or the entity name counts can be listed in entity names list 603, 613, and/or 623 (FIG. 6). In many embodiments, the known product can be a product with known attribute-value pairs, such as in the Walmart.com inventory, or as imported from CNET, Wikipedia, Bowker, Vudu, etc. In many embodiments, block 801 of creating a product entity graph using the group of known products can be implemented as shown in FIG. 9 and described below.

In many embodiments, method 800 can include a block 802 of determining k-grams of the product description. In several embodiments, block 802 can be identical or similar to block 701 (FIG. 7).

In a number of embodiments, method 800 can include a block 803 of, for each k-gram of the product description, determining a matching node of the plurality of nodes of the product entity graph that correspond to the k-gram. In several embodiments, block 803 can be identical or similar to block 702 (FIG. 7).

In many embodiments, method 800 can include a block 804 of, for each k-gram of the product description, determining a derived entity name for the product from the entity names of the matching node. In several embodiments, block 804 can be identical or similar to block 703 (FIG. 7).

In certain embodiments, method 800 can optionally include a block 805 of determining one or more inferred attribute values for the product from one or more related nodes of the plurality of nodes in the product entity graph. In several embodiments, block 805 can be identical or similar to block 704 (FIG. 7).

Turning ahead in the drawings, FIG. 9 illustrates a flow chart for an embodiment of block 801 of creating a product entity graph using a group of known products. Block 801 is merely exemplary and is not limited to the embodiments presented herein. Block 801 can be employed in many different embodiments or examples not specifically depicted or described herein. In some embodiments, the procedures, the processes, and/or the activities of block 801 can be performed in the order presented. In other embodiments, the procedures, the processes, and/or the activities of block 801 can be performed in any suitable order. In still other embodiments, one or more of the procedures, the processes, and/or the activities of block 801 can be combined or skipped. In many embodiments, block 801 can be performed for each known product of the first group of products and/or for each known attribute-value pair of the known product.

Referring to FIG. 9, in some embodiments block 801 can include a block 901 of filtering out a value of the attribute-value pair. For example, the attribute-value pair can be filtered out if the value (a) has a length of more than a word limit threshold, (b) the value is one or more stop words, (c) the value is a yes/no value, and/or (d) the value is a date, as described above.

In a number of embodiments, block 801 also can include a block 902 of normalizing the value of the attribute-value pair to create an entity key. In some embodiments, block 902 can include: (a) for numerical values, converting the value of a regular expression pattern, (b) for units, converting the value to a standard unit value, and/or (c) stemming the value.

In some embodiments, block 801 further can include a block 903 of updating the product entity graph for the entity key. In many embodiments, the entity key and the associated information for the product, such as the product entity name and the product entity value, can be added to or updated in a node structure, edges and/or weights of the product entity graph.

In many embodiments, block 903 can include a block 904 of updating a corresponding node of the plurality of nodes. In many embodiments, if the entity key does not match the entity key value of any of the nodes of the plurality of nodes, block 904 can involve creating the corresponding node and storing the entity key as the entity key value. For example, if the entity key is "hdtv" and node 410 (FIG. 4) and its corresponding node structure 600 (FIG. 6) of the product entity graph (e.g., 400 (FIG. 4), 500 (FIG. 5)) does not yet exist, node 410 (FIG. 4) and its corresponding node structure 600 (FIG. 6) can be created in the product entity graph (e.g., 400 (FIG. 4), 500 (FIG. 5)). Otherwise, if the corresponding node exists, creation of the new node can be skipped. In a number of embodiments, block 904 can involve updating the entity name count for one of the entity names corresponding with an attribute of the attribute-value pair. For example, if the product has attribute-value pair of "brand=Samsung," system 300 (FIG. 3) can determine that node 411 (FIG. 4) is the corresponding node, and can update its corresponding node structure 610 (FIG. 6) by incrementing the entity name count for the product entity name of brand in entity names list 613 (FIG. 6). In some embodiments, block 904 can include updating one or more category item counts of the corresponding node based on one or more categories of the known product. In many embodiments, the category item counts can include the first level hierarchy count and/or the last level hierarchy count, which can be stored in the first level hierarchy list (e.g., 605, 615, 625 (FIG. 6)) and/or the last level hierarchy list (e.g., 606, 616, 626 (FIG. 6)), respectively, and can be updated based on the categorization of the product in the categorization taxonomy.

In several embodiments, block 903 also can include a block 905 of updating weights of edges between the corresponding node and linked nodes of the plurality of nodes corresponding to other of the entity keys for the known product. In many embodiments, the edges can be identical or similar to edges 420-425 (FIG. 4), and/or 526-528 (FIG. 5). For example, in a number of embodiments, if an edge does not yet exist between the corresponding node and the other nodes previously determined to correspond to the product, an edge can be created with a weight of 1, such as shown in FIG. 5 with the addition of edges 526-528 after the addition of node 514. For edges that already exist, the weights of the edges can be incremented, such as shown in FIG. 5 with the incrementing of the weights of edges 420, 421, and 423.

Figure 10:
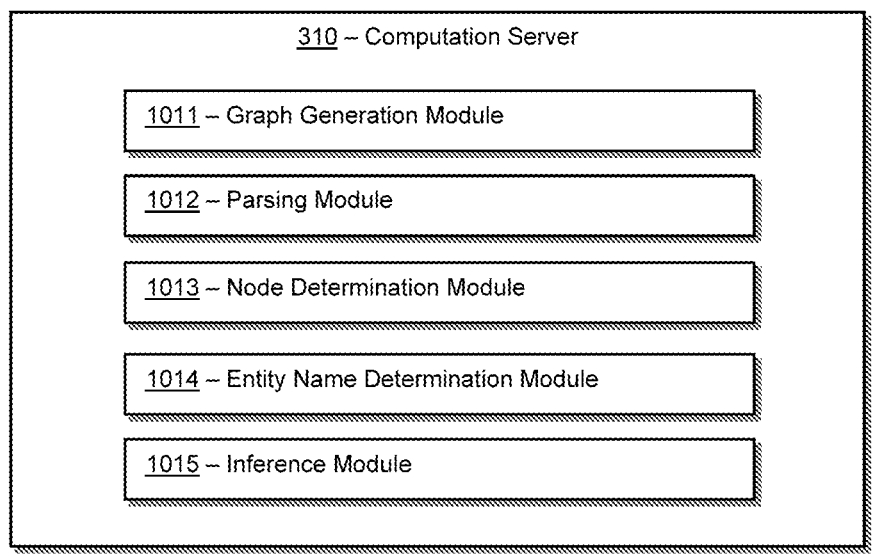
FIG. 10 illustrates a block diagram of an example of various components of the computation server of FIG. 3.

Turning ahead in the drawings, FIG. 10 illustrates a block diagram of computation server 310, according to the embodiment shown in FIG. 3. Computation server 310 is merely exemplary and is not limited to the embodiment presented herein. Computation server 310 can be employed in many different embodiments or examples not specifically depicted or described herein. In some embodiments, certain elements or modules of computation server 310 can perform various procedures, processes, and/or acts. In other embodiments, the procedures, processes, and/or acts can be performed by other suitable elements or modules.

In a number of embodiments, computation server 310 can include a graph generation module 1011. In certain embodiments, graph generation module 1011 can perform block 801 (FIG. 8) of creating a product entity graph using a group of known products and/or can perform blocks 901-905 (FIG. 9). In some embodiments, computation server 310 can include a parsing module 1012. In certain embodiments, parsing module 1012 can perform block 701 (FIG. 7) of determining k-grams of the product description and/or block 802 (FIG. 8) of determining k-grams of the product description. In various embodiments, computation server 310 can include a node determination module 1013. In certain embodiments, node determination module 1013 can perform block 702 (FIG. 7) of determining a matching node that corresponds to the k-gram and/or block 803 (FIG. 8) of determining a matching node that corresponds to the k-gram.

In many embodiments, computation server 310 can include an entity name determination module 1014. In certain embodiments, entity name determination module 1014 can perform block 703 (FIG. 7) of determining a derived entity name for the product and/or block 804 (FIG. 8) of determining a derived entity name for the product. In various embodiments, computation server 310 can include an inference module 1015. In certain embodiments, inference module 1015 can perform block 704 (FIG. 7) of determining one or more inferred attribute values for the product and/or block 805 (FIG. 8) of determining one or more inferred attribute values for the product.

Although determination of product attributes and values using a product entity graph has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 7-9 may include different procedures, processes, and/or activities and be performed by many different modules, in many different orders. As another example, the modules within computation server 310 in FIG. 10 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of determining structured product information for a product from a product description using a product entity graph, the product entity graph comprising a plurality of nodes, each of the plurality of nodes comprising an entity value key, one or more entity names, and an entity name count for each of the one or more entity names, the method being implemented via execution of computer instructions configured to run at one or more processing modules and configured to be stored at one or more non-transitory memory storage modules, the method comprising:
   determining k-grams of the product description;
   for each k-gram of the product description:
      determining a matching node of the plurality of nodes of the product entity graph that corresponds to the k-gram; and
      determining a derived entity name for the product from the one or more entity names of the matching node based at least in part on the entity name counts corresponding to the one or more entity names; and
   categorizing the product for a website based at least in part on one or more of the derived entity names.

2. The method of claim 1, wherein:
   each of the k-grams has a length of no more than six words.

3. The method of claim 1, wherein:
   determining the matching node comprises converting the k-gram to a normalized entity key.

4. The method of claim 3, wherein:
   converting the k-gram to the normalized entity key comprises at least one of: (a) for numerical values, converting the k-gram to a regular expression pattern, (b) for units, converting the k-gram to a standard unit value, or (c) stemming the k-gram.

5. The method of claim 1, further comprising:
determining the k-grams of the product description comprises filtering out the k-grams that are at least one of: (a) stop words, (b) yes/no values, or (c) dates.

6. The method of claim 1, further comprising:
determining one or more inferred attribute values for the product from one or more related nodes of the plurality of nodes in the product entity graph, based on at least in part on the matching nodes for the k-grams and weights of edges in the product entity graph between the one or more related nodes and the matching nodes.

7. A method of determining structured product information for a product from a product description, the method being implemented via execution of computer instructions configured to run at one or more processing modules and configured to be stored at one or more non-transitory memory storage modules, the method comprising:
creating a product entity graph using a group of known products having known attribute-value pairs; the product entity graph comprising a plurality of nodes, each of the plurality of nodes comprising an entity value key, one or more entity names, and an entity name count for each of the one or more entity names;
determining k-grams of the product description;
for each k-gram of the product description:
determining a matching node of the plurality of nodes of the product entity graph that corresponds to the k-gram; and
determining a derived entity name for the product from the one or more entity names of the matching node based at least in part on the entity name counts corresponding to the one or more entity names; and
categorizing the product for a website based at least in part on one or more of the derived entity names.

8. The method of claim 7, wherein:
creating the product entity graph comprises, for each known product of the group of known products:
for each known attribute-value pair of the known product:
filtering out a value of the known attribute-value pair if the value (a) has a length of more than a word limit threshold, (b) is one or more stop words, (c) is a yes/no value, or (d) is a date;
normalizing the value of the known attribute-value pair to create an entity key; and
updating the product entity graph for the entity key comprising:
updating a corresponding node of the plurality of nodes; and
updating weights of edges between the corresponding node and linked nodes of the plurality of nodes corresponding to other one of the entity keys for the known product.

9. The method of claim 8, wherein:
normalizing the value of the known attribute-value pair to create the entity key comprises at least one of: (a) for numerical values, converting the value to a regular expression pattern, (b) for units, converting the value to a standard unit value, or (c) stemming the value.

10. The method of claim 8, wherein:
updating the corresponding node comprises:
if the entity key does not match the entity value key of any of the nodes of the plurality of nodes, creating the corresponding node and storing the entity key as the entity value key;
updating the entity name count for one of the one or more entity names corresponding with an attribute of the known attribute-value pair; and
updating one or more category item counts of the corresponding node based on one or more categories of the known product.

11. The method of claim 7, wherein:
each of the k-grams has a length of no more than six words.

12. The method of claim 7, wherein:
determining the matching node comprises converting the k-gram to a normalized entity key.

13. The method of claim 12, wherein:
converting the k-gram to the normalized entity key comprises at least one of: (a) for numerical values, converting the k-gram to a regular expression pattern, (b) for units, converting the k-gram to a standard unit value, or (c) stemming the k-gram.

14. The method of claim 7, wherein:
determining the k-grams of the product description comprises filtering out k-grams that are at least one of: (a) stop words, (b) yes/no values, or (c) dates.

15. The method of claim 7, further comprising:
determining one or more inferred attribute values for the product from one or more related nodes of the plurality of nodes in the product entity graph, based at least in part on the matching nodes for the k-grams and weights of edges in the product entity graph between the one or more related nodes and the matching nodes.

16. A system for determining structured product information for a product from a product description, the system comprising:
one or more processing circuits; and
one or more non-transitory computer-readable media storing computing instructions configured to run on the one or more processing circuits and perform:
creating a product entity graph using a group of known products having known attribute-value pairs; the product entity graph comprising a plurality of nodes, each of the plurality of nodes comprising an entity value key, one or more entity names, and an entity name count for each of the one or more entity names;
determining k-grams of the product description;
for each k-gram of the product description:
determining a matching node of the plurality of nodes of the product entity graph that corresponds to the k-gram; and
determining a derived entity name from the one or more entity names of the matching node based at least in part on the entity name counts corresponding to the one or more entity names; and
categorizing the product for a website based at least in part on one or more of the derived entity names.

17. The system of claim 16, wherein the computing instructions are further configured such that:
creating the product entity graph comprises, for each known product of the group of known products:
for each known attribute-value pair of the known product:
filtering out a value of the known attribute-value pair if (a) the value has a length of more than a word limit threshold, (b) is one or more stop words, (c) is a yes/no value, or (d) is a date;
normalizing the value of the known attribute-value pair to create an entity key; and updating the product entity graph for the entity key comprising:
- updating a corresponding node of the plurality of nodes; and
- updating weights of edges between the corresponding node and linked nodes of the plurality of nodes corresponding to other of the entity keys for the known product.

18. The system of claim 17, wherein the computing instructions are further configured such that:
normalizing the value of the known attribute-value pair to create the entity key comprises at least one of: (a) for numerical values, converting the value to a regular expression pattern, (b) for units, converting the value to a standard unit value, or (c) stemming the value.

19. The system of claim 17, wherein the computing instructions are further configured such that:
updating the corresponding node comprises:
if the entity key does not match the entity value key of any of the nodes of the plurality of nodes, creating the corresponding node and storing the entity key as the entity value key;
updating the entity name count for one of the one or more entity names corresponding with an attribute of the known attribute-value pair; and
updating one or more category item counts of the corresponding node based on one or more categories of the known product.

20. The system of claim 16, wherein the computing instructions are further configured to perform:
determining one or more inferred attribute values for the product from one or more related nodes of the plurality of nodes in the product entity graph, based at least in part on the matching nodes for the k-grams and weights of edges in the product entity graph between the one or more related nodes and the matching nodes.

* * * * *